(No Model.)
C. DURKEN.
TIRE TIGHTENER.
No. 548,633. Patented Oct. 29, 1895.
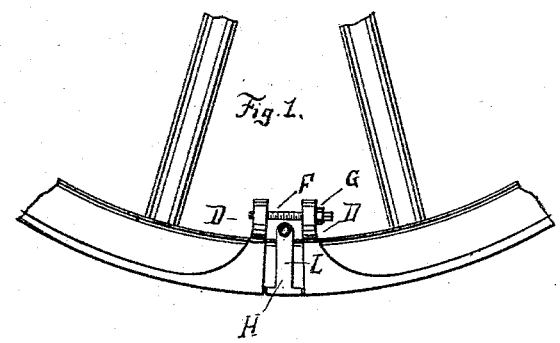
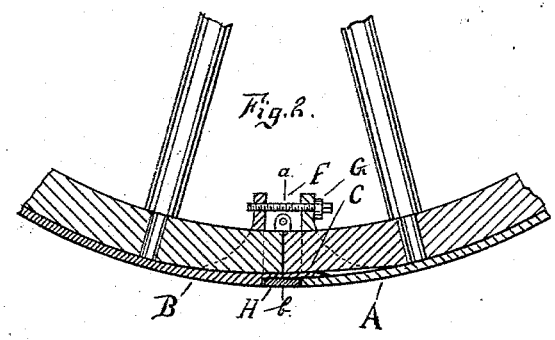
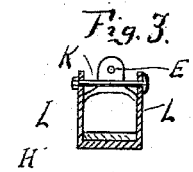
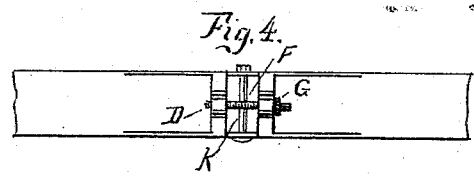
Witnesses
Inventor
Christen Durken
By his Attorney

UNITED STATES PATENT OFFICE.

CHRISTEN DURKEN, OF OMAHA, NEBRASKA.

TIRE-TIGHTENER.

SPECIFICATION forming part of Letters Patent No. 548,633, dated October 29, 1895.

Application filed March 11, 1895. Serial No. 541,271. (No model.)

*To all whom it may concern:*

Be it known that I, CHRISTEN DURKEN, of Omaha, in the county of Douglas and State of Nebraska, have invented certain new and useful Improvements in Tire-Tighteners; and I do hereby declare the following to be a full, clear, and exact description of the invention, such as will enable others skilled in the art to which it appertains to make and use the same.

My invention relates to an improvement in tire-tighteners, the object of the same being to provide certain novel features of construction which will prove durable and economical in construction and efficient in use.

With these ends in view my invention consists in certain features of construction and combinations of parts, as will hereinafter be fully described, and pointed out in the claim.

In the accompanying drawings, Figure 1 is a side view of the device attached to a felly. Fig. 2 is a vertical sectional view of the same. Fig. 3 is a cross-section of Fig. 1 on line $a\ a$, and Fig. 4 is a top view.

The tire-tightener consists of two supplemental pieces of metal A and B, which are concaved sufficiently to enable them to embrace the felly, the same being welded to the tire at their respective ends. The section B is provided with an elongated tapering tongue C, adapted to pass beneath the section A. Both sections are provided with the shoulders D, which project beyond the felly and are provided with the holes E to receive the screw-bolt F, which is provided with a suitable nut G, by means of which the tire is drawn together. As the tongue C will leave a small space in the tire, I provide a clamp H, which is adapted to cover such space and which is held in position by means of the bolt K passing through the lugs L formed thereon.

Having fully described my invention, what I claim as new, and desire to secure by Letters Patent, is—

In a tire tightener, the combination with the concaved sections A and B having the shoulders D, one of said sections being provided with an elongated tongue C, of a bolt to engage said sections for tightening the same and a clamp H fitted between said sections, substantially as shown and described.

In testimony whereof I have signed this specification in the presence of two subscribing witnesses.

CHRISTEN DURKEN.

Witnesses:
   J. H. PARROTTE,
   HANS J. WINTHERLICH.